Nov. 23, 1926.

M. E. CARPENTER

BRICK ICE CREAM HOLDER

Filed Dec. 13, 1923

1,607,664

INVENTOR
Mary E. Carpenter
BY
Munn &Co.
ATTORNEYS

Patented Nov. 23, 1926.

1,607,664

UNITED STATES PATENT OFFICE.

MARY ELLA CARPENTER, OF TERRE HAUTE, INDIANA.

BRICK-ICE-CREAM HOLDER.

Application filed December 13, 1923. Serial No. 680,551.

My invention relates to improvements in brick ice cream holders, and it consists in the combinations, constructions, and arrangements herein described and claimed.

An object of my invention is to provide a device of the type described for holding a slice of brick ice cream in a convenient position for eating, and in which the major part of the ice cream is visible, thereby appealing to the appetite by virtue of its appearance.

A further object of my invention is to provide a device of the type described which is constructed of edible material such as batter or paste baked to a delicate brown. This edible material may be made up in one or more layers of the baked batter, and may be covered with candy material or may have layers of sweet or flavored filling between the superimposed layers of baked batter. The particular object in providing the holder of an edible material is so that portions of the holder may be eaten at the same time that the ice cream is eaten, thereby making the ice cream readily accessible.

A further object of my invention is to provide an ice cream holder of the type described in which a slice of brick ice cream is held in a substantially horizontal position, and in which a handle portion is provided by means of which the holder may be held with its ice cream supporting surface in a horizontal position. This holding of the holder in a horizontal position greatly facilitates the eating of the ice cream, which may be cut in slices of required thickness.

A further object of my invention is to provide a device of the type in which the handle portion thereof is hollow and sealed at its lower end so that the melted ice cream which necessarily must be present, will flow into the handle portion and be retained there. This is an important feature, since this provision obviates the possibility of ice cream falling upon the garments of the user and also prevents the hands from becoming soiled and sticky by contact with the cream.

A further object of my invention is to provide a device of the type described in which the slices of ice cream are held above the major portion of the supporting member so that melted cream therefrom may readily flow into the hollow handle portion. The elevation of the slice of ice cream aids materially in keeping the edible material of the holder in a crisp and appetizing condition.

A further object of my invention is to provide a device of the type described in which the portion of the holder for supporting the slice of ice cream is provided with substantially vertical side walls so that any melted cream is stopped from flowing on the exterior walls of the handle portion or the supporting portion of the holder.

A further object of my invention is to provide a device of the type described which is readily adaptable to the ordinary commercial process for manufacturing such devices, which is durable, which may be transported in quantities with a high degree of safety due to the contour thereof, and which is thoroughly practical commercially.

Other objects and advantages will appear in the following specification, and the novel features of the invention will be particularly pointed out in the appended claim.

My invention is illustrated in the accompanying drawings forming part of this application, in which—

Figure 1:
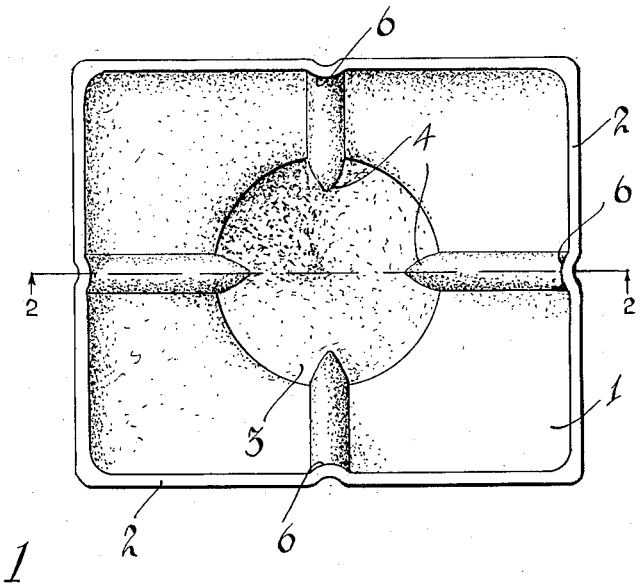
Figure 1 is a top plan view of an embodiment of my invention.
Figure 2:
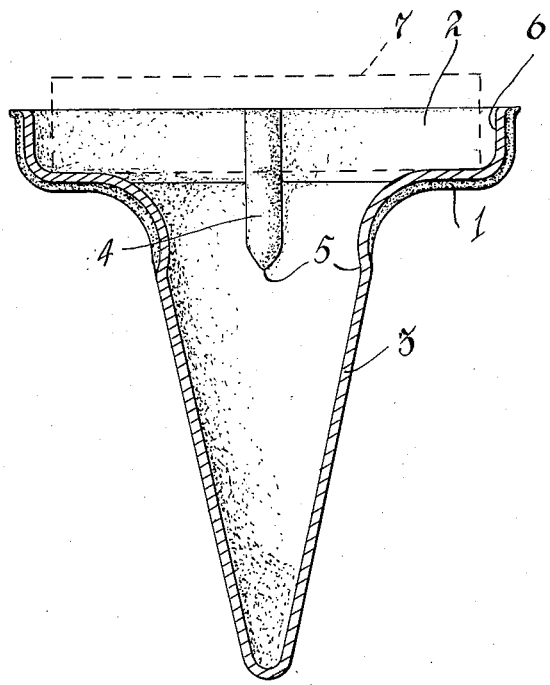
Figure 2 is a section along the line 2—2 of Figure 1.

In carrying out my invention I make use of a substantially rectangular supporting surface 1 forming a part of the entire device. It should be remembered at this time that the entire device is constructed of a single piece of baked edible material, the supporting surface 1 being provided with upwardly extending side walls, 2, having their upper peripheral edges in a common plane. A conical and relatively deep indenture 3 is provided at the central part of the supporting surface 1 and forms a handle portion (see Figure 2). Four equally spaced apart radially extending indentures 4 are provided in the conical indenture 3 of the supporting surface 1, and have their lowermost ends at a point 5 adjacent the upper end or mouth of the indenture 3.

These indentures 4 are formed in such a manner as to provide an inwardly extending ridge on the inner side of the upper portion of the indenture 3 and extend across the supporting surface 1 and up the adjacent side walls 2 as shown at 6. The purpose of these inwardly extending indentures 4 is to support a slice of ice cream as shown at 7, cut from the ordinary type of brick ice cream in a position slightly above the supporting surface 1. Obviously, the ice cream is supported only upon the four ridge portions formed by the indenture, and therefore any cream which may flow from the ice cream as it melts, is permitted to flow into the conical depending indenture 3.

It will be noted that the ridges extend part way down into the hollow handle portion. These ridges aid in keeping the ice cream brick away from the walls of the upper part of the handle portion, so as to maintain a free passage between the brick and the walls for the flow of melted ice cream down into the handle portion.

While I have here described my improved edible ice cream holder as having a rectangular supporting surface 1, and a conical indenture 3, it should be understood that the surface 1 may be of any size and shape required by portions of ice cream of predetermined shape and thickness, and that the handle portion formed by the indenture 3 may be of any desired contour such as pyramidical, or of any angular contour in cross section. It should be noted that while I have shown the edible material as consisting of a single ply of baked batter, that a plurality of plies may be used of any edible material capable of retaining its shape and having its outer walls connected with an edible flavored coating such as candy, ice cream, or the like. It should likewise be noted that the well known material comprising two plies of edible material between which a layer of flavored candy paste is disposed may be employed.

From the foregoing description of the various parts of the device, the operation thereof may be readily understood. In using my improved ice cream holder, the slice of cream, cut from the ordinary type of brick ice cream is placed on the supporting surface 1. This slice of ice cream will assume the position shown in dotted lines in Figure 2. The major portion of the slice will be visible to the person holding the device by means of its conical handle portion.

The holder is held in this manner by the handle portion 3 and while in that position, the ice cream together with the surrounding edible material comprising the side walls 2 and the supporting surface may be eaten simultaneously. It will be noted that any portion of the ice cream that is melted will flow downwardly into the lower portion of the indenture 3 or handle portion and be retained from further movement so that the danger of melted cream falling upon the clothing is entirely obviated.

I claim:

A device for supporting ice cream comprising a substantially horizontal supporting member of edible material, said member being provided with side walls at the peripheral edges thereof and being further provided with a depending hollow portion fashioned to provide a handle member by means of which said supporting member may be manually supported, and also to provide a suitable receptacle for the reception of melted portions of ice cream, said horizontal supporting member being fashioned with upwardly extending ribs on the bottom surface thereof, and inwardly projecting ribs on its side walls, said upwardly projecting ribs extending down into that portion of said supporting member forming the depending hollow portion.

MARY ELLA CARPENTER.